US012567605B2

(12) United States Patent
Lee et al.

(10) Patent No.: US 12,567,605 B2
(45) Date of Patent: Mar. 3, 2026

(54) ELECTROLYTE INCLUDING COORDINATION COMPOUND CATALYST FORMED OF TRANSITION METAL CATION AND AROMATIC-CONTAINING LIGAND AND LITHIUM BATTERY INCLUDING THE SAME

(71) Applicant: Electronics and Telecommunications Research Institute, Daejeon (KR)

(72) Inventors: Young-Gi Lee, Daejeon (KR); Jaecheol Choi, Daejeon (KR); Sung You Hong, Daejeon (KR); Kwang Man Kim, Daejeon (KR); Jeong Woo Lee, Daejeon (KR); Min Ho Jeon, Daejeon (KR); Jimin Oh, Daejeon (KR); Jinwoo Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 685 days.

(21) Appl. No.: 17/947,469

(22) Filed: Sep. 19, 2022

(65) Prior Publication Data

US 2023/0163356 A1 May 25, 2023

(30) Foreign Application Priority Data

Nov. 23, 2021 (KR) ........................ 10-2021-0162581
Mar. 17, 2022 (KR) ........................ 10-2022-0033621

(51) Int. Cl.
*H01M 10/0567* (2010.01)
*H01M 10/0525* (2010.01)
*H01M 10/42* (2006.01)

(52) U.S. Cl.
CPC ... *H01M 10/0567* (2013.01); *H01M 10/0525* (2013.01); *H01M 10/4235* (2013.01); *H01M 2300/0037* (2013.01)

(58) Field of Classification Search
CPC ......... H01M 10/0567; H01M 10/0525; H01M 10/4235
(Continued)

(56) References Cited

U.S. PATENT DOCUMENTS 9,093,720 B2 7/2015 Park et al.
9,123,970 B2 9/2015 Lee et al.
(Continued)

FOREIGN PATENT DOCUMENTS

JP 6-283206 A 10/1994
JP 9-45369 A 2/1997
(Continued)

OTHER PUBLICATIONS

"aromatic." In New Oxford American Dictionary, edited by Stevenson, Angus, and Christine A. Lindberg. : Oxford University Press, 2010. https://www.oxfordreference.com/view/10.1093/acref/9780195392883.001.0001/m_en_us1223008. (Year: 2010).*
(Continued)

*Primary Examiner* — Sean P Cullen
(74) *Attorney, Agent, or Firm* — NSIP Law

(57) ABSTRACT

Provided is a lithium battery including a first electrode structure, a second electrode structure spaced apart from the first electrode structure, and an electrolyte between the first electrode structure and the second electrode structure, wherein the electrolyte includes a lithium salt, an organic solvent, and an additive, wherein the additive includes a coordination compound catalyst represented by Formula 1.

$TMX{\cdot}yH_2O$ [Formula 1]

n Formula 1, TM is a +2-valent transition metal cation, y is an integer of 0 to 6, and X is a −2-valent ligand containing an aromatic ring.

19 Claims, 6 Drawing Sheets

A

(58) Field of Classification Search
USPC ....... 429/188, 324, 328, 329, 336, 337, 338, 429/339, 340, 341
See application file for complete search history.

(56) References Cited

U.S. PATENT DOCUMENTS

| | | | | |
|---|---|---|---|---|
| 2001/0046626 | A1* | 11/2001 | Kida | H01M 10/0567 429/188 |
| 2002/0031710 | A1* | 3/2002 | Kezuka | H01M 10/0565 429/231.95 |
| 2007/0292754 | A1* | 12/2007 | Lee | H01M 10/0525 429/212 |
| 2013/0337337 | A1 | 12/2013 | Lee et al. | |
| 2014/0255773 | A1 | 9/2014 | Hung et al. | |
| 2017/0018806 | A1 | 1/2017 | Shin et al. | |

FOREIGN PATENT DOCUMENTS

| | | | |
|---|---|---|---|
| JP | 2010-73595 | A | 4/2010 |
| JP | 2015-53211 | A | 3/2015 |
| JP | 2017-27925 | A | 2/2017 |
| KR | 10-0838986 | B1 | 6/2008 |
| KR | 10-2015-0083363 | A | 7/2015 |

OTHER PUBLICATIONS

"aromatic compound." In A Dictionary of Chemistry, edited by Law, Jonathan, and Richard Rennie. : Oxford University Press, 2020. https://www.oxfordreference.com/view/10.1093/acref/9780198841227.001.0001/acref-9780198841227-e-315. (Year: 2020).*

Kim, Seokwoo, et al. "A flame-retardant composite polymer electrolyte for lithium-ion polymer batteries." *Electrochimica Acta* vol. 241 (2017). pp 553-559.

Jiang, Xiaoyu, et al. "A novel bifunctional thermo-sensitive poly (lactic acid)@ poly (butylene succinate) core-shell fibrous separator prepared by a coaxial electrospinning route for safe lithium-ion batteries." *Journal of Materials Chemistry A* vol. 5. Issue 44 (2017). pp 23238- 23242.

* cited by examiner

ELECTROLYTE INCLUDING COORDINATION COMPOUND CATALYST FORMED OF TRANSITION METAL CATION AND AROMATIC-CONTAINING LIGAND AND LITHIUM BATTERY INCLUDING THE SAME

CROSS-REFERENCE TO RELATED APPLICATIONS

This U.S. non-provisional patent application claims priority under 35 U.S.C. § 119 of Korean Patent Application Nos. 10-2021-0162581, filed on Nov. 23, 2021, and 10-2022-0033621, filed on Mar. 17, 2022, the entire contents of which are hereby incorporated by reference.

BACKGROUND

The present disclosure herein relates to a lithium battery, and more particularly to an electrolyte composition of a lithium battery.

A secondary battery may include a lithium battery. Recently, the application of the lithium battery has been expanded. For example, the lithium battery has been widely used as a power source of an electric vehicle (EV) and an energy storage system (ESS). When the flame retardant content increases, there may be limitations of cost and performance.

In recent years, many attempts have been made to improve a liquid electrolyte/separator system in the lithium battery. However, it is considered that it takes a long time for the system to be commercialized due to limitations such as relatively low ion conductivity, instability, and large internal resistance. Therefore, studies on ways to improve the safety of a liquid electrolyte without reducing cell performance while maintaining a liquid electrolyte-based lithium battery system are ongoing.

SUMMARY

The present disclosure provides an electrolyte composition having improved thermal stability and electrochemical characteristics and a lithium battery electrolyte including the same.

The present disclosure also provides a lithium battery having improved electrochemical characteristics.

The purpose of the present disclosure is not limited to the aforementioned, but other purposes not described herein will be clearly understood by those skilled in the art from descriptions below.

The present disclosure relates to an electrolyte composition and a lithium battery including the same. An embodiment of the inventive concept provides a lithium battery including: a first electrode structure; a second electrode structure spaced apart from the first electrode structure; and an electrolyte between the first electrode structure and the second electrode structure, wherein the electrolyte includes a lithium salt, an organic solvent, and an additive, wherein the additive includes a coordination compound catalyst represented by Formula 1.

$TMX \cdot yH_2O$ [Formula 1]

In Formula 1, TM is a +2-valent transition metal cation, y is an integer of 0 to 6, and X is a −2-valent ligand containing an aromatic or heteroaromatic ring.

In an embodiment, in Formula 1 above, X may be represented by Formula 2A:

[Formula 2A]

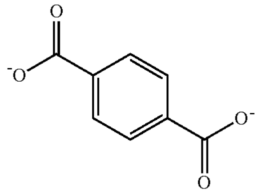

In an embodiment, in Formula 1 above, X may be represented by Formula 2B, Formula 2C, or Formula 2D:

[Formula 2B]

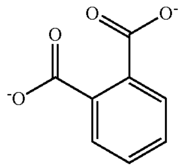

[Formula 2C]

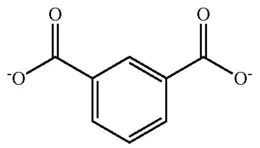

[Formula 2D]

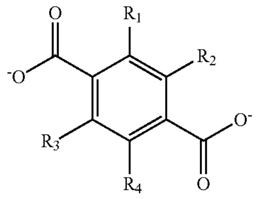

In Formula 2D, $R_1$, $R_2$, $R_3$, and $R_4$ are each independently a hydrogen atom, an alkyl group having 1 to 6 carbon atoms, a fluoroalkyl group having 1 to 6 carbon atoms, an aryl group having 6 to 10 carbon atoms, a fluoro group, a nitro group, an amino group, or a cyano group, and at least one of $R_1$, $R_2$, $R_3$, or $R_4$ is an alkyl group having 1 to 6 carbon atoms, a fluoroalkyl group having 1 to 6 carbon atoms, an aryl group having 6 to 10 carbon atoms, a fluoro group, a nitro group, an amino group, or a cyano group.

In an embodiment, in Formula 1 above, X may be represented by Formula 2E, Formula 2F, or Formula 2G:

[Formula 2E]

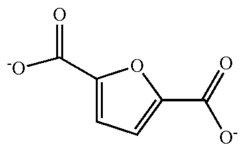

[Formula 2F]

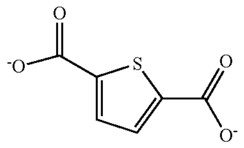

-continued

[Formula 2G]

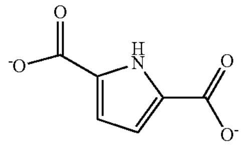

In an embodiment, in Formula 1 above, X may be represented by Formula 2H:

[Formula 2H]

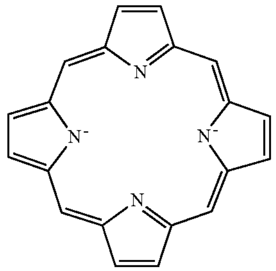

In an embodiment, the composition ratio of the coordination compound catalyst may be about 0.1 wt % to about 20 wt % of the electrolyte.

In an embodiment, the additive may further include a flame retardant, and the flame retardant may include at least one of a phosphoric acid-based flame retardant, an acrylic-based flame retardant, a fluorine-based flame retardant, a silicone-based polymer flame retardant, or an ionic liquid.

In an embodiment, the composition ratio of the flame retardant may be about 0.1 wt % to about 30 wt % of the electrolyte.

In an embodiment, the first electrode structure may include a first current collector, and a first electrode layer on the first current collector, and the first electrode layer may be provided between the first current collector and the electrolyte.

In an embodiment, the second electrode structure may include a second current collector, and a second electrode layer on the second current collector, and the second electrode layer may be provided between the second current collector and the electrolyte.

In an embodiment, the lithium battery may further include a separator between the first electrode structure and the second electrode structure, wherein the electrolyte may be provided between the first electrode structure and the separator and between the second electrode structure and the separator.

In an embodiment of the inventive concept, an electrolyte composition includes a lithium salt; an organic solvent; and an additive, wherein the additive includes a coordination compound catalyst represented by Formula 1:

$TMX \cdot yH_2O$ [Formula 1]

In Formula 1, TM is a +2-valent transition metal cation, y is an integer of 0 to 6, and X is a −2-valent ligand containing an aromatic or heteroaromatic ring.

In an embodiment, in Formula 1 above, X may be represented by Formula 2A:

[Formula 2A]

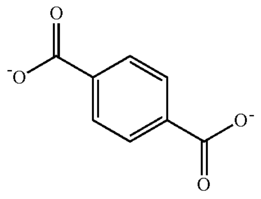

In an embodiment, in Formula 1 above, X may be represented by Formula 2B, Formula 2C, or Formula 2D:

[Formula 2B]

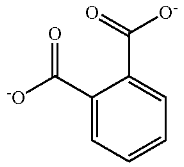

[Formula 2C]

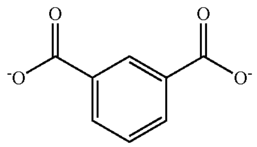

[Formula 2D]

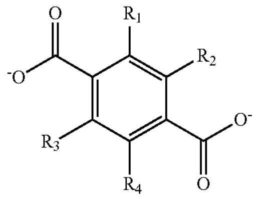

In Formula 2D, $R_1$, $R_2$, $R_3$, and $R_4$ are each independently a hydrogen atom, an alkyl group having 1 to 6 carbon atoms, a fluoroalkyl group having 1 to 6 carbon atoms, an aryl group having 6 to 10 carbon atoms, a fluoro group, a nitro group, an amino group, or a cyano group, and at least one of $R_1$, $R_2$, $R_3$, or $R_4$ is an alkyl group having 1 to 6 carbon atoms, a fluoroalkyl group having 1 to 6 carbon atoms, an aryl group having 6 to 10 carbon atoms, a fluoro group, a nitro group, an amino group, or a cyano group.

In an embodiment, in Formula 1 above, X may be represented by Formula 2E, Formula 2F, or Formula 2G:

[Formula 2E]

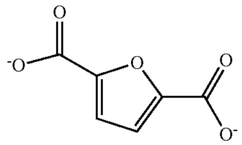

[Formula 2F]

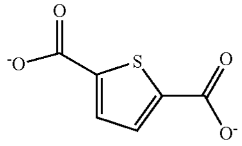

-continued

[Formula 2G]

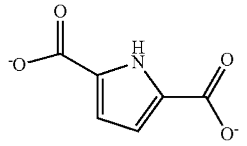

In an embodiment, in Formula 1 above, X may be represented by Formula 2H:

[Formula 2H]

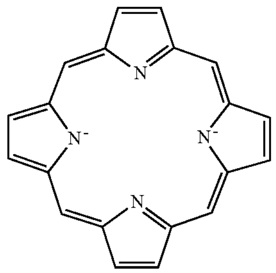

In an embodiment, the organic solvent may include at least one of linear carbonate, cyclic carbonate, or cyclic ester.

In an embodiment, the additive may further include a flame retardant, and the flame retardant may include at least one of a phosphoric acid-based flame retardant, an acrylic-based flame retardant, a fluorine-based flame retardant, a silicone-based polymer flame retardant, or an ionic liquid.

In an embodiment, the lithium salt may include at least one of $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$, $LiC(CF_3SO_2)_3$, or $LiC_4BO_8$.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
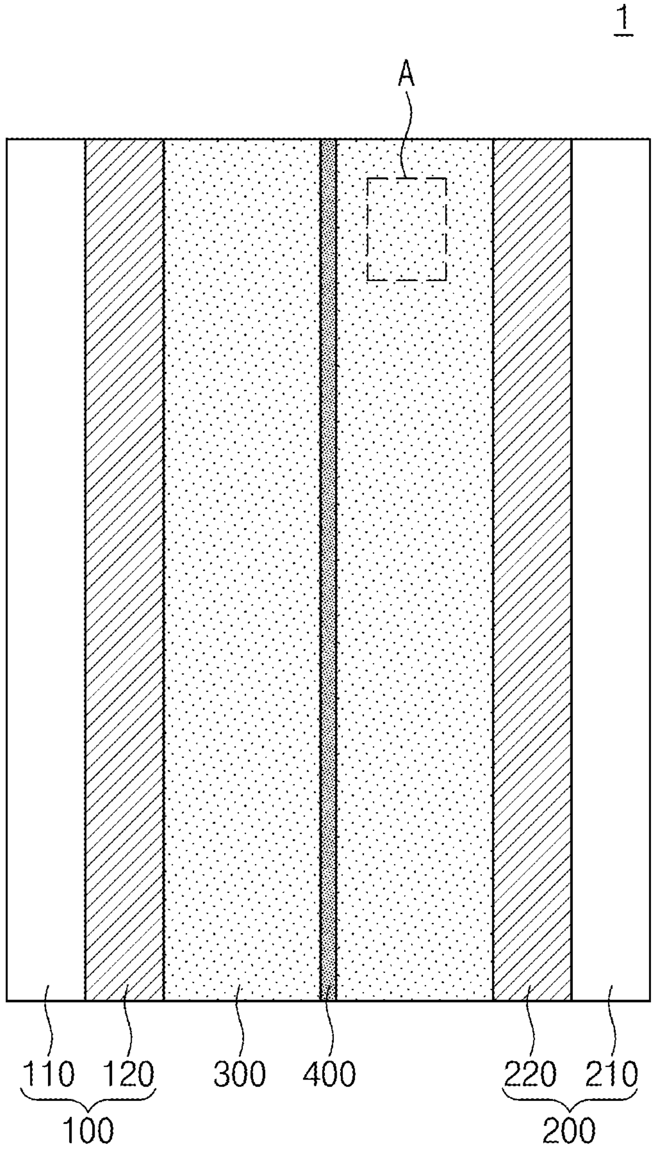
FIG. 1 is a cross-sectional view illustrating a lithium battery according to an embodiment of the inventive concept.

Preferred embodiments of the inventive concept will be described with reference to the accompanying drawings so as to sufficiently understand constitutions and effects of embodiments of the inventive concept. The inventive concept may, however, be embodied in different forms and should not be construed as limited to the embodiments set forth herein. Rather, these embodiments are provided so that this disclosure will be thorough and complete, and will fully convey the scope of the present disclosure to those skilled in the art. A person with ordinary skill in the art to which the present disclosure pertains will understand that the inventive concept can be carried out under any appropriate condition.

The terminology used herein is for the purpose of describing particular embodiments only and is not intended to be limiting of the invention. As used herein, the singular forms, "a," "an" and "the" are intended to include the plural forms as well, unless the context clearly indicates otherwise. It will be understood that the terms "comprises" and/or "comprising," when used in this specification, specify the presence of stated components, steps, operations and/or elements, but do not preclude the presence or addition of one or more other components, steps, operations and/or elements.

It will be understood that when a film (or layer) is referred to as being 'on' another film (or layer) or substrate, it can be directly on the another film (or layer) or substrate, or intervening films (or layers) may also be present therebetween.

Also, though terms like a first, and a second are used to describe various regions and layers (or films) in various embodiments of the present invention, the regions and the layers are not limited to these terms. These terms are used only to distinguish a predetermined region or film (or layer) from another region or film (or layer). Therefore, a layer referred to as a first layer in one embodiment can be referred to as a second layer in another embodiment. Each embodiment described and exemplified herein also includes a complementary embodiment thereof. Like reference numerals refer to like elements throughout.

In this document, each of phrases such as "A or B", "at least one of A and B", "at least one of A or B", "at least one of A, B or C", and "at least one of A, B, or C" may include any one of the items listed together in the corresponding phrase, or all possible combinations thereof.

Unless otherwise defined, all terms used in embodiments of the inventive concept have the same meaning as commonly understood by one of ordinary skill in the art to which this invention belongs.

Hereinafter, an electrolyte material, a lithium battery electrolyte, and a lithium battery according to the inventive concept will be explained with reference to the accompanying drawings.

FIG. 1 is a cross-sectional view illustrating a lithium battery according to an embodiment of the inventive concept.

Referring to FIG. 1, a lithium battery 1 may include a first electrode structure 100, a second electrode structure 200, and an electrolyte 300. The lithium battery 1 may further include a separator 400.

The first electrode structure 100 may include a first current collector 110 and a first electrode layer 120. The first electrode structure 100 may serve as a cathode. The first current collector 110 may include a metal such as aluminum (Al). The first electrode layer 120 may be disposed on the first current collector 110. The first electrode layer 120 may be electrically connected to the first current collector 110. The first electrode layer 120 may contain a cathode active material, a conductive agent, and a binder. The cathode active material may include, for example, at least one of sulfur, $LiCoO_2$, $LiNiO_2$, $LiNi_xCo_yMn_zO_2$ (where, each of x, y, and z is a real number of at least 0, and x+y+z=1) (hereinafter, NCM), $LiMn_2O_4$, or $LiFePO_4$. For example, the binder may include a fluorine-based polymer such as polyvinylidene fluoride (PVDF). The conductive agent may include carbon-containing materials such as conductive amorphous carbon, carbon nanotubes, and/or graphene. The first conductive layer 120 may contain the binder and the conductive agent, and thus may have improved mechanical binding strength and electrical conductivity. As an example, the weight ratio of active material:binder:conductive agent in the first electrode layer 120 may be about 94:3:3.

The second electrode structure 200 may face and be spaced apart from the first electrode structure 100. The second electrode structure 200 may include a second current collector 210 and a second electrode layer 220. The second electrode structure 200 may serve as an anode. The second electrode layer 220 may be disposed between the second current collector 210 and the first electrode layer 120. The second current collector 210 may include a metal such as copper (Cu). The second electrode layer 220 may be disposed on the second current collector 210. The second electrode layer 220 may be electrically connected to the second current collector 210. The second electrode layer 220 may contain an anode active material and a second binder. The anode active material may include a carbon-based material (e.g., natural graphite and/or artificial graphite) or a non-carbon-based material (e.g., silicon, silicon oxide, and/or lithium metal). The second binder may include a cellulose-based binder and/or an organic-based binder. The second binder may include, for example, at least one of carboxymethyl cellulose (CMC), styrene-butadiene rubber (SBR), an emulsion, or polyvinylidene fluoride (PVDF). As an example, the weight ratio of active material:second binder in the second electrode layer 220 may be about 97:3.

A separator 400 may be interposed between the first electrode structure 100 and the second electrode structure 200. The separator may be provided between the first electrode layer 120 and the second electrode layer 220, and be spaced apart from the first electrode layer 120 and the second electrode layer 220. The separator 400 may include a base layer and a coating layer. The base layer may include a polymer. For example, the base layer may include at least one of cellulose or polyolefin such as polyethylene and/or polypropylene. The separator may include a porous polymer film or non-woven fabric. The coating layer may cover the base layer. As an example, the coating layer may include inorganic materials such as $Al_2O_3$, $TiO_2$, and/or $SiO_2$. As another example, the coating layer may include carboxymethyl cellulose (CMC), styrene-butadiene rubber (SBR), polyvinylidene fluoride (PVDF) and/or a mixture thereof. As another example, the coating layer may include an inorganic material and an organic material.

An electrolyte 300 may be interposed between the first electrode structure 100 and the second electrode structure 200. For example, the electrolyte 300 may be interposed between the first electrode layer 120 and the second electrode layer 220. The electrolyte 300 may fill a gap region between the first electrode layer 120 and the separator 400 and a gap region between the second electrode layer 220 and the separator 400. Ions may move between the first electrode structure 100 and the second electrode structure 200 via the electrolyte 300. The ions may be lithium ions. Hereinafter, the electrolytes according to embodiments will be described in more detail.

Figure 2:
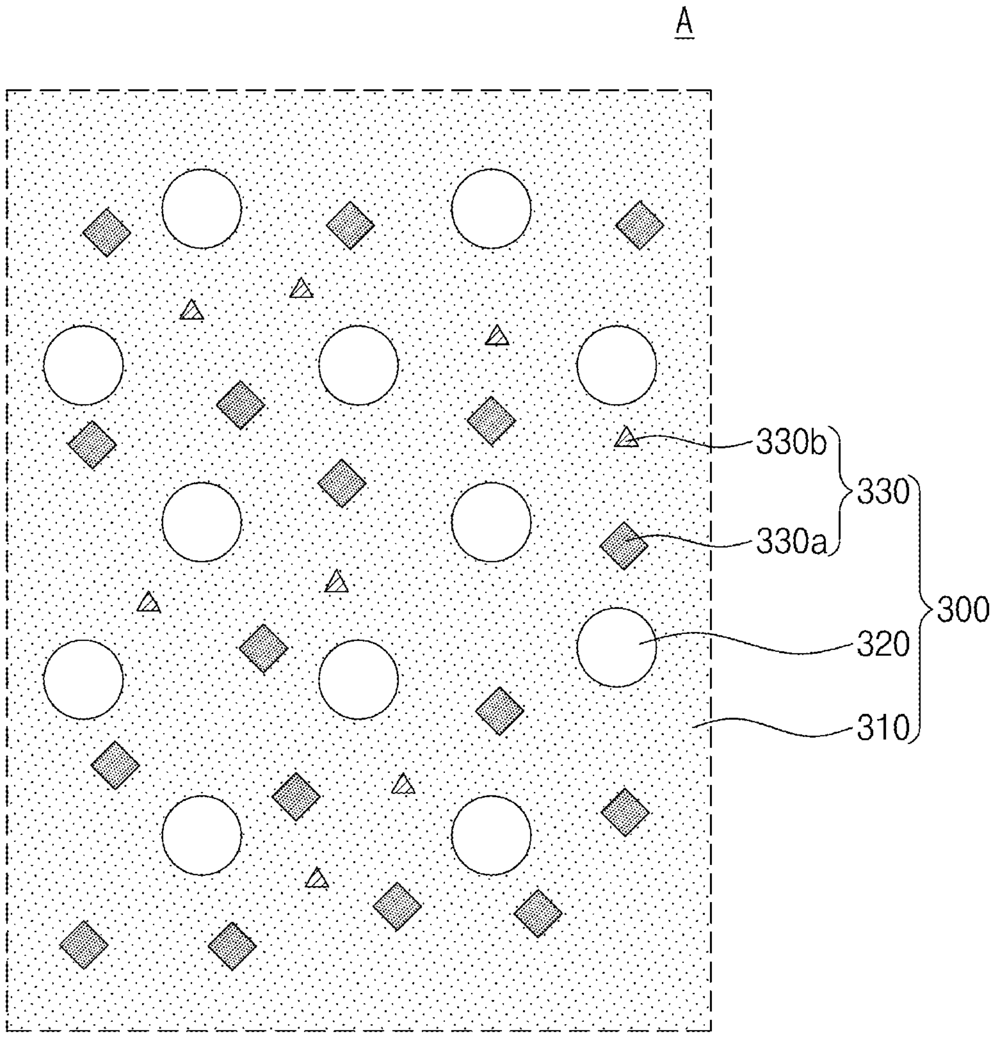
FIG. 2 is a view for describing electrolytes according to embodiments, and is an enlarged view of region A in FIG. 1.

FIG. 2 is a view for describing electrolytes according to embodiments, and is an enlarged view of region A in FIG. 1. Hereinafter, the duplicated descriptions, which have been described already, will be omitted.

Referring to FIG. 2, the electrolyte 300 may include an electrolyte composition. The electrolyte 300 may include a liquid electrolyte. The electrolyte composition may contain an organic solvent 310, a lithium salt 320, and an additive 330.

The organic solvent 310 may include at least one of linear carbonate, cyclic carbonate, or cyclic ester. The linear carbonate may include, for example, at least one of dimethyl carbonate, diethyl carbonate, or ethyl methyl carbonate. The cyclic carbonate may include, for example, at least one of ethylene carbonate or propylene carbonate. The cyclic ester may include, for example, γ-butyrolactone.

The lithium salt 320 may include, for example, at least one of $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$, $LiC(CF_3SO_2)_3$, or $LiC_4BO_8$.

The additive 330 may include a coordination compound catalyst **330*a*. The coordination compound catalyst 330*a*** may include at least one among materials represented by Formula 1 below:

$TMX \cdot yH_2O$ [Formula 1]

In Formula 1, TM may be a +2-valent transition metal cation. As an example, TM may include one of Mn(II), Fe(II), Co(II), Ni(II), Cu(II), or Zn(II). y may be an integer of 0 to 6. X may be a −2-valent ligand, and contain an aromatic or heteroaromatic ring. As an example, X may include one among materials represented by Formula 2A to Formula 2H below:

[Formula 2A]

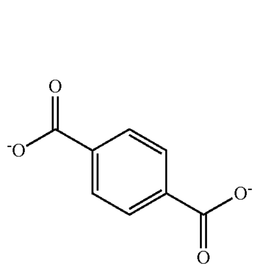

[Formula 2B]

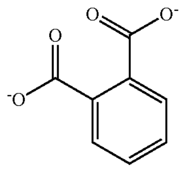

-continued

[Formula 2C]

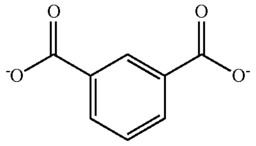

[Formula 2D]

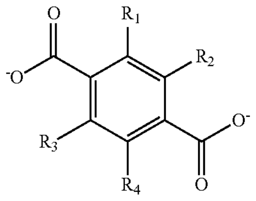

In Formula 2D, $R_1$, $R_2$, $R_3$, and $R_4$ may be each independently a hydrogen atom, an alkyl group having 1 to 6 carbon atoms, a fluoroalkyl group having 1 to 6 carbon atoms, an aryl group having 6 to 10 carbon atoms, a fluoro group, a nitro group, an amino group, or a cyano group, and at least one of $R_1$, $R_2$, $R_3$, or $R_4$ may include an alkyl group having 1 to 6 carbon atoms, a fluoroalkyl group having 1 to 6 carbon atoms, an aryl group having 6 to 10 carbon atoms, a fluoro group, a nitro group, an amino group, or a cyano group.

[Formula 2E]

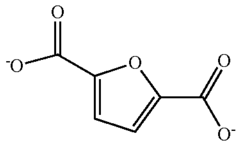

[Formula 2F]

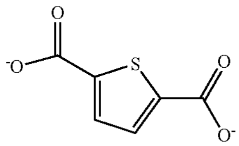

[Formula 2G]

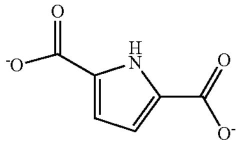

[Formula 2H]

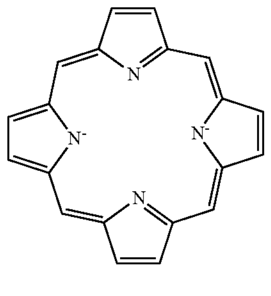

The composition ratio of the coordination compound 330*a* may be about 0.1 wt % to about 20 wt % of the electrolyte composition. The composition ratio of the coordination compound 330*a* is about 20 wt % or less, and thus the lithium battery 1 including the electrolyte composition may have improved electrochemical characteristics. For example, if the additive 330 is greater than about 20 wt %, the mobility of lithium ions between the electrolyte 300 and the first and second electrode layers 120 and 220 may be reduced or side reactions of the electrolyte 300 may occur. The side reactions of the electrolyte 300 may be undesired reactions. In addition, the coordination compound catalyst 330*a* may have little effect on the viscosity of the electrolyte 300. Accordingly, this may not affect an injection process of the electrolyte 300 at the time of manufacturing the lithium battery 1.

In general, when the temperature inside the cell of the lithium battery increases, a short circuit due to shrinkage or melting of the electrode and the separator in the cell and direct electron conduction of lithium ions may occur. Accordingly, this may cause ignition or explosion in the cell.

According to an embodiment of the inventive concept, the coordination compound catalyst 330*a* may not be activated when the temperature is lower than about 100° C. The coordination compound catalyst 330*a* may be activated when the temperature in the lithium battery cell is elevated to about 100° C. or higher. The activated coordination compound catalyst 330*a* may react with a double bond of carbonate (C═O) in the organic solvent 310. The reaction is represented by Reaction Scheme 1.

[Reaction Scheme 1]

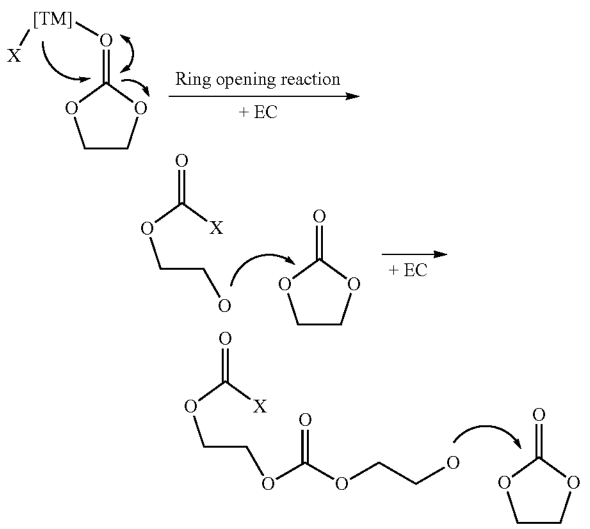

In Reaction Scheme 1 above, the coordination compound catalyst 330*a* is represented by [TM]-X.

Referring to FIG. 1, FIG. 2, and Reaction Scheme 1, the linear carbonate or cyclic carbonate in the organic solvent 310 may produce a polymer through polymerization. The polymer may be a solid. Accordingly, since the electrolyte 300 in the liquid state is solidified under the first temperature condition or higher, it is possible to prevent the first electrode layer 120, the second electrode layer 220, and the separator 400 from being rapidly and severely damaged due to heat. In addition, rapid movement of lithium ions may be suppressed by increasing resistance. The first temperature condition may be about 100° C. or higher. For example, the first temperature condition may be about 100° C. to about 200° C.

As an example, the electrolyte 300 may be in a solid state at about 100° C. to about 200° C., but the embodiment of the inventive concept is not limited thereto. Accordingly, the rapid and severe damage of the cell of the lithium battery 1 may be prevented, thereby mitigating or delaying ignition and explosion in the cell. Accordingly, the lithium battery 1 may have improved thermal stability.

The additive 330 may further include a flame retardant 330*b*. The flame retardant 330*b* may include at least one of a phosphoric acid-based flame retardant, an acrylic-based flame retardant, a fluorine-based flame retardant, a silicone-based polymer flame retardant, or an ionic liquid. The phosphoric acid-based flame retardant may include trimethyl phosphate (TMP), triethyl phosphate (TEP), dimethyl methylphosphonate (DMMP), diethyl ethylphosphonate (DEEP), triphenyl phosphate (TPP), and/or 4-isopropylphenyl diphenyl phosphate (IPPP).

The additive 330 may be injected into a pouch cell, and thus the lithium battery 1 may be manufactured. As an example, the pouch cell electrolyte 330 may be injected and stored at about 60° C. for about 12 hours, be subjected to formation and degassing, followed by a sealing process under reduced pressure, thereby manufacturing the lithium battery.

Hereinafter, synthesis of the coordination compound catalyst represented by Formula 1A, preparation of the electrolyte composition, and manufacture of the lithium battery will be described with reference to Experimental Examples of the inventive concept.

[Synthesis of Coordination Compound Catalyst]

[Formula 1A]

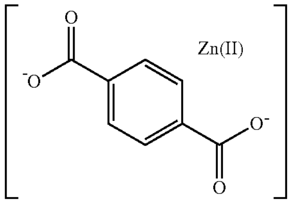

Sodium terephthalate (1.0 eq, 5 mmol) and $Zn(NO_3)_2 6H_2O$ (1.0 eq, 5 mmol) were added to water (10 mL) to prepare a mixture. The mixture was stirred at about 20° C. for about 24 hours to perform a reaction represented by Reaction Scheme 1A below. The reaction may be a metal exchange reaction. After the reaction was completed, the solvent was removed through filtration and dried under reduced pressure to obtain Product 1A represented by Formula 1A.

[Reaction Scheme 1A]

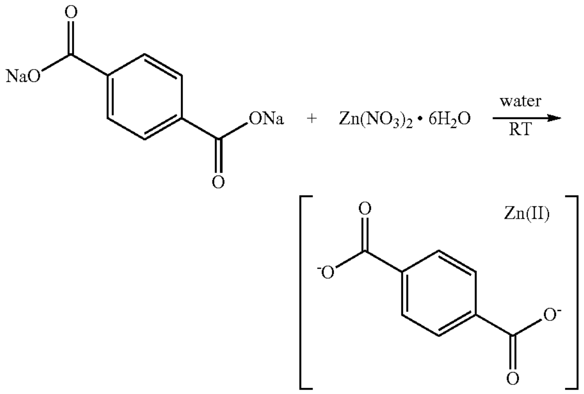

[Manufacture of Lithium Battery and Evaluation of Electrolyte Composition and Lithium Battery]

1. Comparative Example 1

(1) Manufacture of Lithium Battery (Preparation of First Electrode Structure) an NCM622 active material along with a PVDF binder were dispersed in an NMP organic solvent to prepare a slurry. In this case, the composition of NCM622 active material:binder:conductive agent was prepared in a weight ratio of about 94:3:3. The slurry was applied on an Al current collector and dried to prepare a first electrode structure.

(Preparation of Second Electrode Structure) SBR and CMC were mixed in a weight ratio of about 1:1 to prepare a SBR/CMC binder. A natural graphite active material and the SBR/CMC binder were dispersed in water in a weight ratio of about 97:3 to prepare a slurry. The slurry was applied on a Cu current collector and dried to prepare a second electrode structure.

(Preparation of Electrolyte Composition) 1 M lithium salt ($LiPF_6$) was added to a preliminary mixture obtained by mixing ethylene carbonate (EC) and diethylene carbonate (DEC) in a weight ratio of about 1:1 to prepare a mixture. The mixture does not contain an additive.

(Manufacture of Lithium Battery) The N/P ratio between the negative electrode structure and the positive electrode structure was 1.05, and the thickness and loading of each electrode were determined. A 1 Ah level-pouch cell was prepared in the form of a stack cell. An electrolyte containing the electrolyte composition was injected into the pouch cell. A formation process was performed under a current condition of 100 mA (0.1C-rate), followed by a degassing process to finally manufacture a lithium battery.

(2) Evaluation (Evaluation of Electrolyte Composition) The electrolyte composition of Comparative Example 1 was evaluated for dispersion, turbidity, viscosity, temperature sensing characteristics, and ionic conductivity. The viscosity was measured based on about 20° C. In the evaluation of the temperature sensing characteristics, the viscosity and phase were observed and compared while maintaining the electrolyte composition at about 60° C., about 100° C., about 120° C., and about 150° C. each for about 10 minutes based on 20° C.

(Evaluation of Lithium Battery) The electrochemical stability, charge/discharge performance, and service life characteristics of Comparative Example 1 were evaluated. Charge/discharge performance was evaluated under 4.2 V charge and 3.0 V discharge cut-off conditions. The service life characteristics were evaluated by performing 100 charge/discharge cycles of the lithium battery at a current of 1,000 mA (1C-rate).

2. Experimental Example 1

(1) Manufacture of Lithium Battery (Preparation of Electrolyte Composition) Product 1A represented by Formula 1A (1 wt %) was added to the same electrolyte composition as in Comparative Example 1 to prepare an electrolyte composition.

(Manufacture of Lithium Battery) A lithium battery was manufactured in the same manner as in Comparative Example 1, but the aforementioned electrolyte composition was used as an electrolyte composition.

(2) Evaluation (Evaluation of Electrolyte Composition) The electrolyte composition prepared in Experimental Example 1 was evaluated for dispersion, turbidity, viscosity, temperature sensing characteristics, and ionic conductivity. The evaluation method was the same as in Comparative Example 1.

(Evaluation of Lithium Battery) The electrochemical stability, charge/discharge performance, and service life characteristics of the lithium battery manufactured in Experimental Example 1 were evaluated. The evaluation method was the same as in Comparative Example 1.

3. Experimental Example 2

(1) Manufacture of Lithium Battery (Preparation of Electrolyte Composition) Product 1A represented by Formula 1A (3 wt %) was added to the same electrolyte composition as in Comparative Example 1 to prepare an electrolyte composition.

(Manufacture of Lithium Battery) A lithium battery was manufactured in the same manner as in Comparative Example 1, but the aforementioned electrolyte composition was used as an electrolyte composition.

(2) Evaluation (Evaluation of Electrolyte Composition) The electrolyte composition prepared in Experimental Example 2 was evaluated for dispersion, turbidity, viscosity, temperature sensing characteristics, and ionic conductivity. The evaluation method was the same as in Comparative Example 1.

(Evaluation of Lithium Battery) The electrochemical stability, charge/discharge performance, and service life characteristics of the lithium battery manufactured in Experimental Example 2 were evaluated. The evaluation method was the same as in Comparative Example 1.

4. Experimental Example 3

(1) Manufacture of Lithium Battery (Preparation of Electrolyte Composition) Product 1A represented by Formula 1A (5 wt %) was added to the same electrolyte composition as in Comparative Example 1 to prepare an electrolyte composition.

(Manufacture of Lithium Battery) A lithium battery was manufactured in the same manner as in Comparative Example 1, but the aforementioned electrolyte composition was used as an electrolyte composition.

(2) Evaluation (Evaluation of Electrolyte Composition) The electrolyte composition prepared in Experimental Example 3 was evaluated for dispersion, turbidity, viscosity, temperature sensing characteristics, and ionic conductivity. The evaluation method was the same as in Comparative Example 1.

(Evaluation of Lithium Battery) The electrochemical stability, charge/discharge performance, and service life characteristics of the lithium battery manufactured in Experimental Example 3 were evaluated. The evaluation method was the same as in Comparative Example 1.

5. Experimental Example 4

(1) Manufacture of Lithium Battery (Preparation of Electrolyte Composition) Product 1A represented by Formula 1A (7 wt %) was added to the same electrolyte composition as in Comparative Example 1 to prepare an electrolyte composition.

(Manufacture of Lithium Battery) A lithium battery was manufactured in the same manner as in Comparative Example 1, but the aforementioned electrolyte composition was used as an electrolyte composition.

(2) Evaluation (Evaluation of Electrolyte Composition) The electrolyte composition prepared in Experimental Example 4 was evaluated for dispersion, turbidity, viscosity, temperature sensing characteristics, and ionic conductivity. The evaluation method was the same as in Comparative Example 1.

(Evaluation of Lithium Battery) The electrochemical stability, charge/discharge performance, and service life characteristics of the lithium battery manufactured in Experimental Example 4 were evaluated. The evaluation method was the same as in Comparative Example 1.

6. Experimental Example 5

(1) Manufacture of Lithium Battery (Preparation of Electrolyte Composition) Product 1A represented by Formula 1A (10 wt %) was added to the same electrolyte composition as in Comparative Example 1 to prepare an electrolyte composition.

(Manufacture of Lithium Battery) A lithium battery was manufactured in the same manner as in Comparative Example 1, but the aforementioned electrolyte composition was used as an electrolyte composition.

(2) Evaluation (Evaluation of Electrolyte Composition) The electrolyte composition prepared in Experimental Example 5 was evaluated for dispersion, turbidity, viscosity, temperature sensing characteristics, and ionic conductivity. The evaluation method was the same as in Comparative Example 1.

(Evaluation of Lithium Battery) The electrochemical stability, charge/discharge performance, and service life characteristics of the lithium battery manufactured in Experimental Example 5 were evaluated. The evaluation method was the same as in Comparative Example 1.

Table 1 shows results of measuring dispersion, turbidity, and viscosity of the electrolyte composition of Comparative Example 1, the electrolyte composition of Experimental Example 1, the electrolyte composition of Experimental Example 2, the electrolyte composition of Experimental Example 3, the electrolyte composition of Experimental Example 4, and the electrolyte composition of Experimental Example 5. Product 1A, which is a coordination compound catalyst, was not dissolved in the electrolyte, but was uniformly dispersed.

TABLE 1

| | Dispersion | Turbidity | Viscosity (cP) |
|---|---|---|---|
| Comparative Example 1 | — | — | 2 to 3 |
| Experimental Example 1 | No floating matters | Clear | 2 to 3 |
| Experimental Example 2 | No floating matters | Clear | 2 to 3 |
| Experimental Example 3 | No floating matters | Clear | 2 to 3 |
| Experimental Example 4 | No floating matters | Somewhat opaque | 3 to 4 |
| Experimental Example 5 | No floating matters | Somewhat opaque | 4 to 5 |

Referring to Table 1, the electrolyte composition of Experimental Example 1, the electrolyte composition of Experimental Example 2, the electrolyte composition of Experimental Example 3, the electrolyte composition of Experimental Example 4, and the electrolyte composition of Experimental Example 5 are compared with the electrolyte composition of Comparative Example 1, it may be confirmed that there are no significant differences in dispersion, turbidity, and viscosity.

Table 2 shows results of observing phases depending on temperatures in order to evaluate temperature sensing characteristics of the electrolyte composition of Comparative Example 1, the electrolyte composition of Experimental Example 1, the electrolyte composition of Experimental Example 2, the electrolyte composition of Experimental Example 3, the electrolyte composition of Experimental Example 4, and the electrolyte composition of Experimental Example 5.

TABLE 2

| | Temperature | | | | |
|---|---|---|---|---|---|
| | 20° C. | 60° C. | 100° C. | 120° C. | 150° C. |
| Comparative Example 1 | Liquid | Liquid | Liquid | Liquid | Liquid |
| Experimental Example 1 | Liquid | Liquid | High viscosity liquid | Gel | Solid |
| Experimental Example 2 | Liquid | Liquid | High viscosity liquid | Gel | Solid |
| Experimental Example 3 | Liquid | Liquid | Gel-like state | Solid | Solid |
| Experimental Example 4 | Liquid | Liquid | Gel-like state | Solid | Solid |
| Experimental Example 5 | Liquid | Liquid | Gel-like state | Solid | Solid |

Table 3 shows results by measuring viscosities depending on temperatures in order to evaluate temperature sensing characteristics of the electrolyte composition of Comparative Example 1, the electrolyte composition of Experimental Example 1, the electrolyte composition of Experimental Example 2, the electrolyte composition of Experimental Example 3, the electrolyte composition of Experimental Example 4, and the electrolyte composition of Experimental Example 5. In this case, the unit of viscosity is cP.

TABLE 3

| | Temperature | | | | |
|---|---|---|---|---|---|
| | 20° C. | 60° C. | 100° C. | 120° C. | 150° C. |
| Comparative Example 1 | 2 to 3 | 1 to 2 | 0.5 to 1 | 0.5 to 0.9 | 0.3 to 0.8 |
| Experimental Example 1 | 2 to 3 | 1 to 2 | 30 to 35 | 250 to 260 | — |
| Experimental Example 2 | 2 to 3 | 1 to 2 | 30 to 35 | 250 to 260 | — |
| Experimental Example 3 | 2 to 3 | 1 to 2 | 80 to 90 | — | — |
| Experimental Example 4 | 3 to 4 | 2 to 3 | 120 to 130 | — | — |
| Experimental Example 5 | 4 to 5 | 3 to 4 | 140 to 150 | — | — |

Referring to Table 2 and Table 3, it may be confirmed that the electrolyte composition of Comparative Example 1 is liquid regardless of an increase in temperature in a range of 20° C. to 150° C., and has a low viscosity. In the cases of 20° C. and 60° C., it may be confirmed that all of the electrolyte composition of Comparative Example 1 and the electrolyte compositions of Experimental Example 1 to Experimental Example 5 are liquid, and the viscosity is hardly increased. Accordingly, it may be confirmed that the coordination compound catalyst is not activated in the cases of 20° C. and 60° C. However, in the cases of 100° C. and 120° C., the viscosities of the electrolyte compositions of Experimental Example 1 to Experimental Example 5 rapidly increase, and when the temperature reaches 120° C., it may be confirmed that the electrolyte compositions of Experimental Example 3 to Experimental Example 5 become solid. In the case of 150° C., it may be confirmed that all of the electrolyte compositions of Experimental Example 1 to Experimental Example 5 become solid. Accordingly, the coordination compound catalysts added in Experimental Example 1 to Experimental Example 5 may be considered a temperature-sensitive catalyst.

Figure 3:
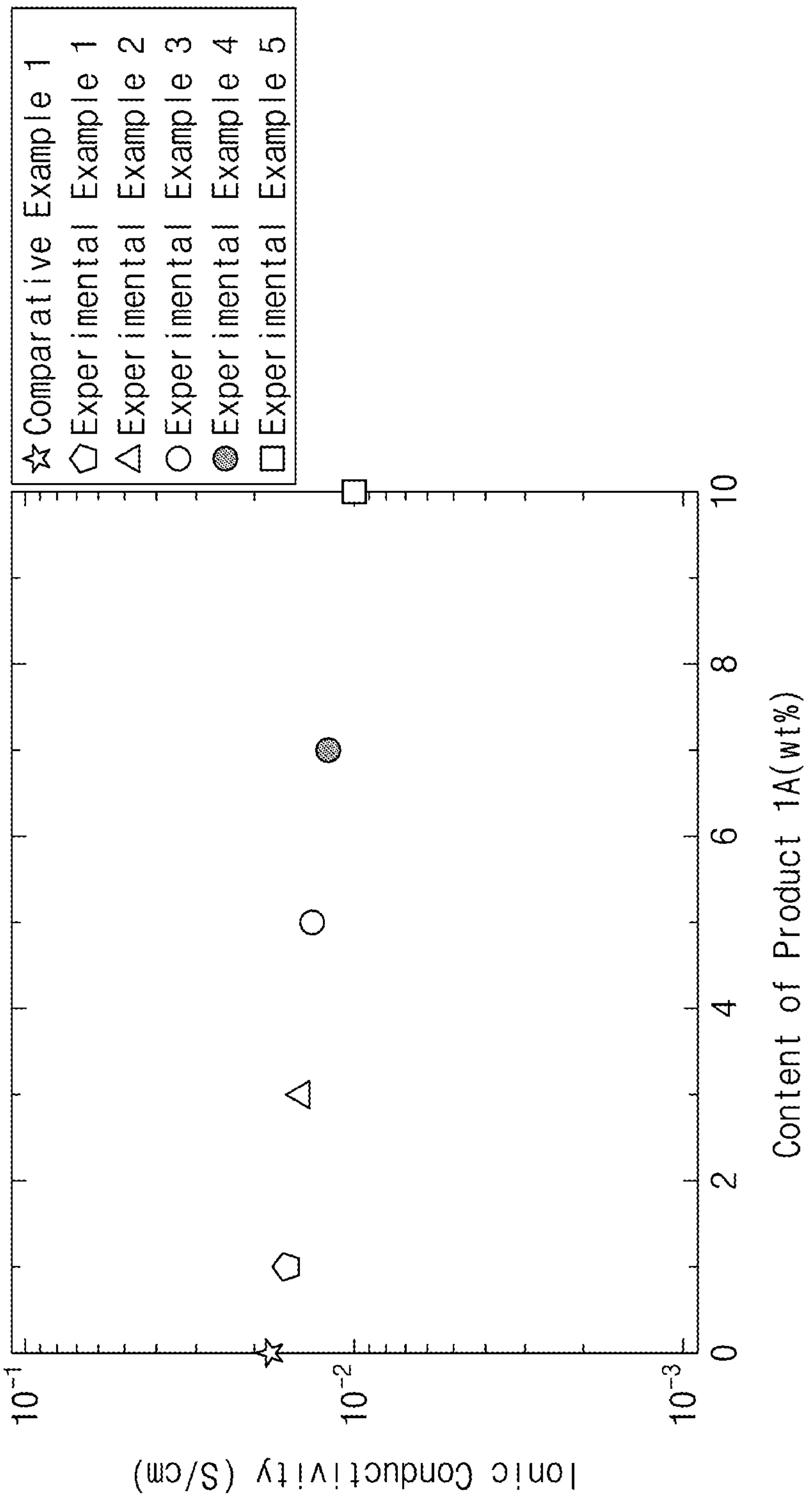
FIG. 3 is a view for describing the evaluation of ionic conductivities of the electrolyte compositions of Comparative Example 1, Experimental Example 1, Experimental Example 2, Experimental Example 3, Experimental Example 4, and Experimental Example 5, and is a graph showing the ionic conductivity versus the content of the coordination compound catalyst.

FIG. 3 is a view for describing the evaluation of ionic conductivities of the electrolyte compositions of Comparative Example 1, Experimental Example 1, Experimental Example 2, Experimental Example 3, Experimental Example 4, and Experimental Example 5, and is a graph showing the ionic conductivity versus the content of the coordination compound catalyst.

Referring to FIG. 3, it may be understood that the electrolyte compositions of Experimental Example 1, Experimental Example 2, Experimental Example 3, Experimental Example 4, and Experimental Example 5 to which the coordination compound catalyst was added have little decrease in the ionic conductivity when compared to the electrolyte composition of Comparative Example 1 to which the coordination compound catalyst was not added. That is, it may be confirmed that when the coordination compound catalyst is inactivated, ion conduction of lithium ions is not disturbed.

Figure 4:
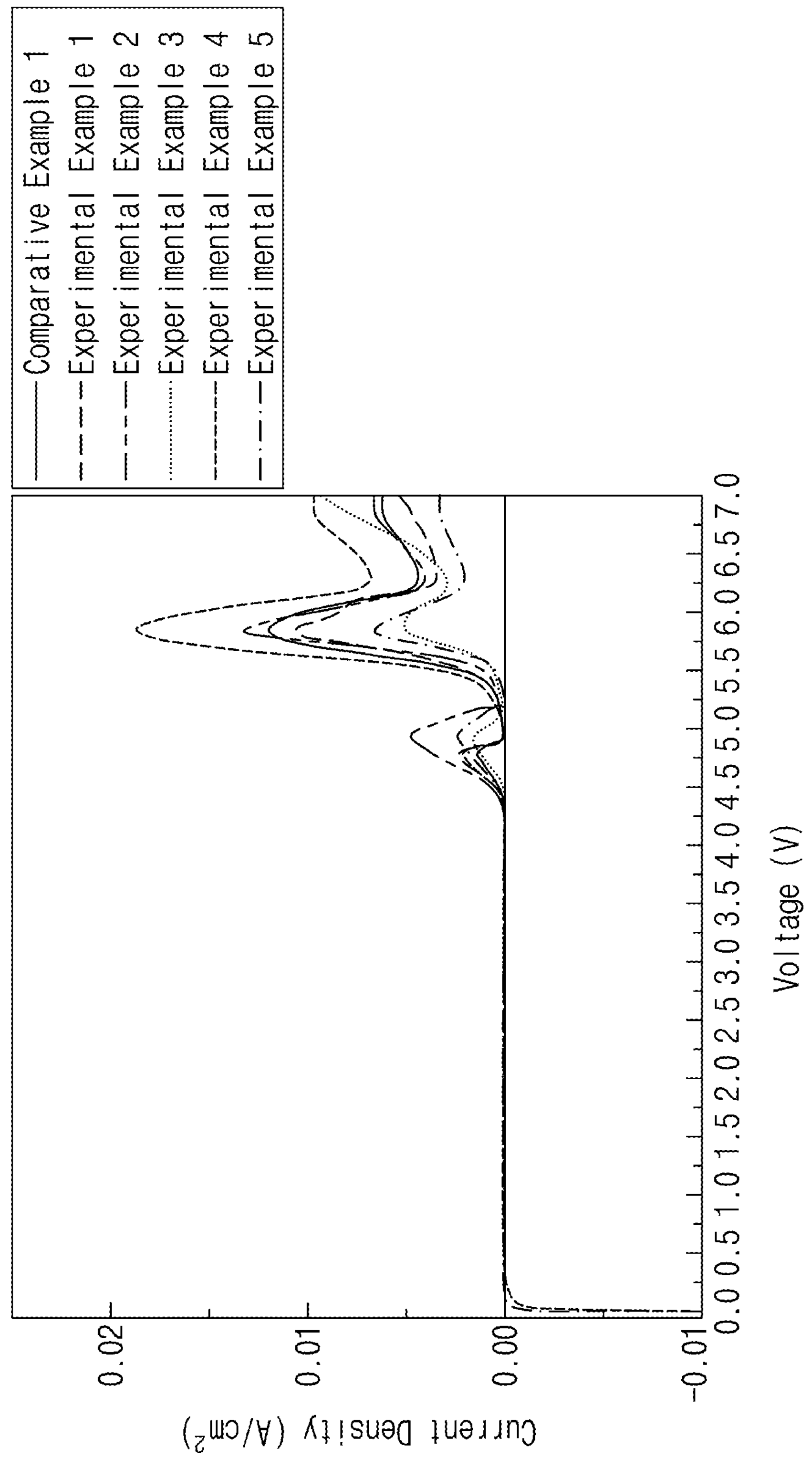
FIG. 4 is a view for describing the evaluation of electrochemical stabilities at 20° C. of electrolyte compositions of Comparative Example 1, Experimental Example 1, Experimental Example 2, Experimental Example 3, Experimental Example 4, and Experimental Example 5, and is a graph showing a current density versus a voltage in each electrolyte composition at 20° C.

FIG. 4 is a view for describing the evaluation of electrochemical stabilities at 20° C. of electrolyte compositions of Comparative Example 1, Experimental Example 1, Experimental Example 2, Experimental Example 3, Experimental Example 4, and Experimental Example 5, and is a graph showing a current density versus a voltage in each electrolyte composition at 20° C.

Referring to FIG. 4, it may be confirmed that the electrolyte compositions of Experimental Example 1, Experimental Example 2, Experimental Example 3, Experimental Example 4, and Experimental Example 5 to which the coordination compound catalyst was added has no significant differences in the electrochemical stability when compared to that of Comparative Example 1 which does not contain the coordination compound catalyst. That is, it may be confirmed that the coordination compound catalyst has very low electrochemically reactivity at 20° C.

Figure 5:
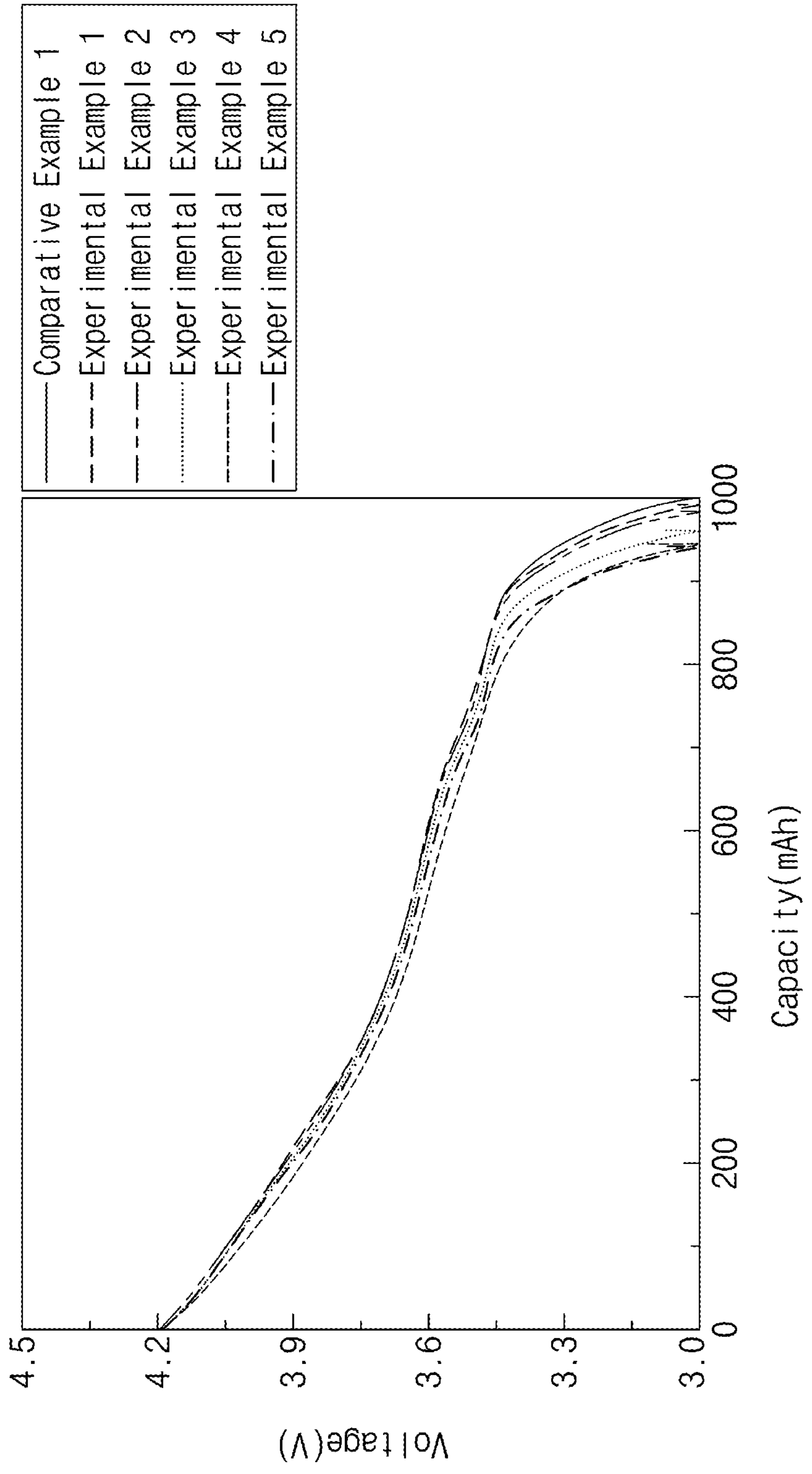
FIG. 5 is a view for describing the evaluation of initial charge and discharge performance characteristics of lithium batteries of Comparative Example 1, Experimental Example 1, Experimental Example 2, Experimental Example 3, Experimental Example 4, and Experimental Example 5, and is a graph showing voltages versus discharge capacities of lithium batteries at 20° C.

FIG. 5 is a view for describing the evaluation of initial charge and discharge performance characteristics of lithium batteries of Comparative Example 1, Experimental Example 1, Experimental Example 2, Experimental Example 3, Experimental Example 4, and Experimental Example 5, and is a graph showing voltages versus discharge capacities of lithium batteries at 20° C.

Referring to FIG. 5, it may be confirmed that the discharge capacities of the lithium batteries of Experimental Example 1, Experimental Example 2, Experimental Example 3, Experimental Example 4, and Experimental Example 5 to which the coordination compound catalyst was added have no significant differences when compared to that of the lithium battery of Comparative Example 1 which does not contain the coordination compound catalyst. That is, it may be confirmed that the coordination compound catalyst is not activated at 20° C., and thus reaction does not occur.

Figure 6:
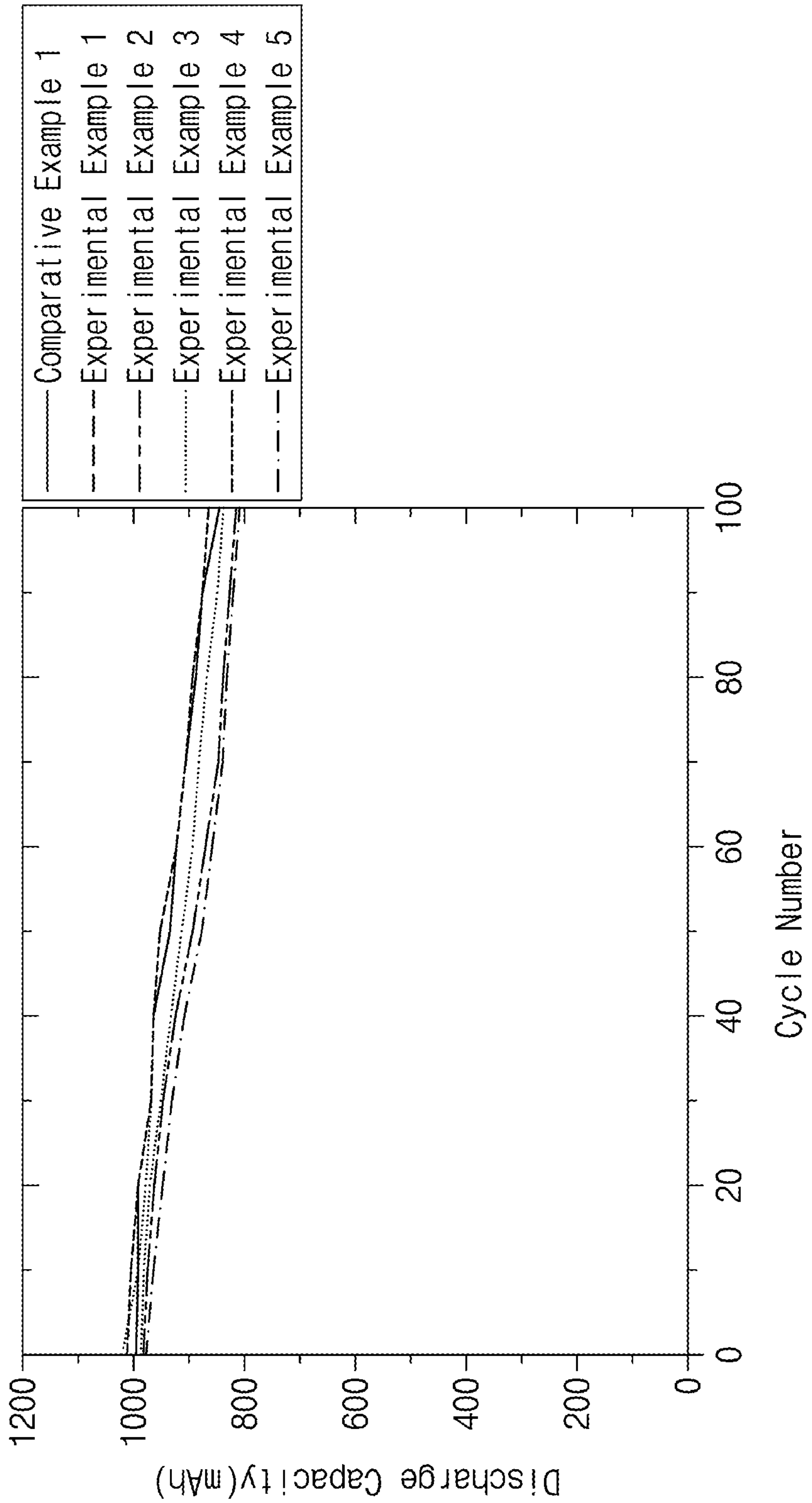
FIG. 6 is a view for describing the evaluation of cycle life characteristics of the lithium batteries of Comparative Example 1, Experimental Example 1, Experimental Example 2, Experimental Example 3, Experimental Example 4, and Experimental Example 5, and is a graph showing discharge capacities versus cycle numbers.

FIG. 6 is a view for describing the evaluation of cycle life characteristics of the lithium batteries of Comparative Example 1, Experimental Example 1, Experimental Example 2, Experimental Example 3, Experimental Example 4, and Experimental Example 5, and is a graph showing discharge capacities versus cycle numbers.

Referring to FIG. 6, it may be confirmed that the service lives of the lithium batteries of Experimental Example 1, Experimental Example 2, Experimental Example 3, Experimental Example 4, and Experimental Example 5 to which the coordination compound catalyst was added are similar to that of the lithium battery of Comparative Example 1 which does not contain the coordination compound catalyst. That is, it may be confirmed that the coordination compound catalyst is not activated at 20° C., and thus reaction does not occur, and side reactions do not occur, either.

Referring to FIGS. 3 to 6, it may be seen that the coordination compound catalyst 330*a* is not activated at 20° C. and thus does not affect the electrochemical characteristics of the lithium battery 1, and is activated and reacted only when the temperature in the lithium battery 1 is elevated. Accordingly, the thermal stability of the lithium battery 1 may be improved by mitigating and delaying ignition and explosion in the cell. In addition, the electrochemical characteristics of the lithium battery 1 may be improved by adding a smaller amount of the flame retardant than an existing flame retardant.

According to the inventive concept, the electrolyte composition and the lithium battery including the same may have improved thermal stability. The lithium battery may have improved electrochemical characteristics.

Although the embodiments of the present invention have been described, it is understood that the present invention should not be limited to these embodiments but various changes and modifications can be made by one ordinary skilled in the art within the spirit and scope of the present invention as hereinafter claimed.

What is claimed is:

1. An electrolyte composition, comprising:

a lithium salt;

an organic solvent; and an additive, wherein the additive includes a coordination compound catalyst represented by Formula 1:

$TMX \cdot yH_2O$, [Formula 1]

wherein, in Formula 1, TM is a +2-valent transition metal cation, y is an integer of 0 to 6, and X is a −2-valent ligand containing an aromatic compound, and wherein a composition ratio of the coordination compound catalyst is about 4 wt % to about 12 wt % of the electrolyte composition.

2. The electrolyte composition of claim 1, wherein the organic solvent includes at least one of linear carbonate, cyclic carbonate, or cyclic ester or combination thereof.

3. The electrolyte composition of claim 1, wherein the lithium salt includes at least one of $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$, $LiC(CF_3SO_2)_3$, or $LiC_4BO_8$ or combination thereof.

4. The electrolyte composition of claim 1, wherein, in Formula 1 above, X is represented by Formula 2A:

[Formula 2A]

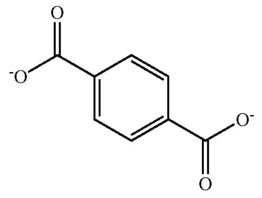

5. The electrolyte composition of claim 1, wherein, in Formula 1 above, X is represented by Formula 2B, Formula 2C, or Formula 2D:

[Formula 2B]

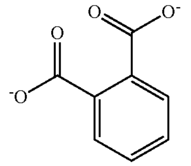

[Formula 2C]

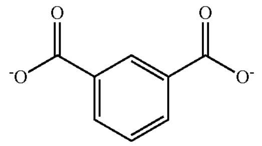

[Formula 2D]

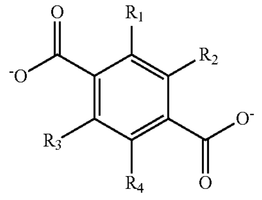

wherein, in Formula 2D, $R_1$, $R_2$, $R_3$, and $R_4$ are each independently a hydrogen atom, an alkyl group having 1 to 6 carbon atoms, a fluoroalkyl group having 1 to 6 carbon atoms, an aryl group having 6 to 10 carbon atoms, a fluoro group, a nitro group, an amino group, or a cyano group, and at least one of $R_1$, $R_2$, $R_3$, or $R_4$ is an alkyl group having 1 to 6 carbon atoms, a fluoroalkyl group having 1 to 6 carbon atoms, an aryl group having 6 to 10 carbon atoms, a fluoro group, a nitro group, an amino group, or a cyano group or combination thereof.

6. The electrolyte composition of claim 1, wherein, in Formula 1 above, X is represented by Formula 2E, Formula 2F, or Formula 2G:

[Formula 2E]

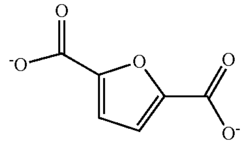

[Formula 2F]

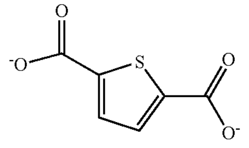

-continued

[Formula 2G]

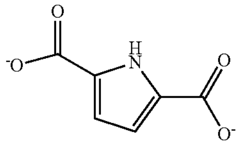

7. The electrolyte composition of claim 1, wherein, in Formula 1 above, X is represented by Formula 2H:

[Formula 2H]

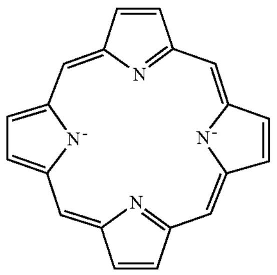

8. The electrolyte composition of claim 1, wherein the additive further includes a flame retardant, and the flame retardant includes at least one of a phosphoric acid-based flame retardant, an acrylic-based flame retardant, a fluorine-based flame retardant, a silicone-based polymer flame retardant, or an ionic liquid or combination thereof.

9. The electrolyte composition of claim 8, wherein a composition ratio of the flame retardant is about 0.1 wt % to about 30 wt % of the electrolyte.

10. A lithium battery, comprising:

a first electrode structure;

a second electrode structure spaced apart from the first electrode structure; and an electrolyte disposed between the first electrode structure and the second electrode structure, wherein the electrolyte includes:

a lithium salt, an organic solvent, and an additive, wherein the additive includes a coordination compound catalyst represented by Formula 1:

$TMX \cdot yH_2O$, [Formula 1]

wherein, in Formula 1, TM is a +2-valent transition metal cation, y is an integer of 0 to 6, and X is a −2-valent ligand containing an aromatic compound or a heteroaromatic compound, and wherein a composition ratio of the coordination compound catalyst is about 4 wt % to about 12 wt % of the electrolyte.

11. The lithium battery of claim 10, further comprising a separator between the first electrode structure and the second electrode structure, wherein the electrolyte is provided between the first electrode structure and the separator and between the second electrode structure and the separator.

12. The lithium battery of claim 10, wherein, in Formula 1 above, X is represented by Formula 2A:

[Formula 2A]

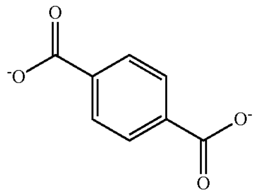

13. The lithium battery of claim 10, wherein, in Formula 1 above, X is represented by Formula 2B, Formula 2C, or Formula 2D:

[Formula 2B]

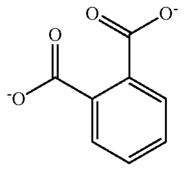

[Formula 2C]

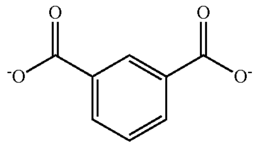

[Formula 2D]

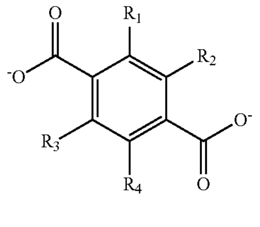

wherein, in Formula 2D, $R_1$, $R_2$, $R_3$, and $R_4$ are each independently a hydrogen atom, an alkyl group having 1 to 6 carbon atoms, a fluoroalkyl group having 1 to 6 carbon atoms, an aryl group having 6 to 10 carbon atoms, a fluoro group, a nitro group, an amino group, or a cyano group, and at least one of $R_1$, $R_2$, $R_3$, or $R_4$ is an alkyl group having 1 to 6 carbon atoms, a fluoroalkyl group having 1 to 6 carbon atoms, an aryl group having 6 to 10 carbon atoms, a fluoro group, a nitro group, an amino group, or a cyano group or combination thereof.

14. The lithium battery of claim 10, wherein, in Formula 1 above, X is represented by Formula 2E, Formula 2F, or Formula 2G:

[Formula 2E]

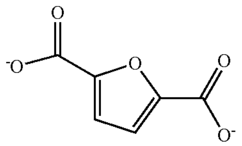

[Formula 2F]

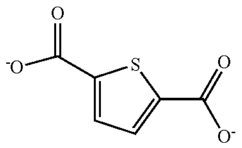

[Formula 2G]

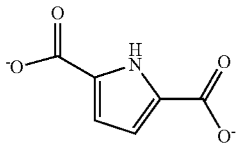

15. The lithium battery of claim 10, wherein, in Formula 1 above, X is represented by Formula 2H:

[Formula 2H]

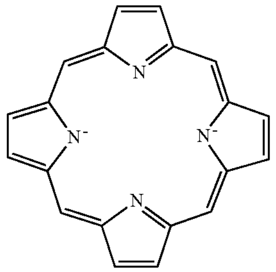

16. The lithium battery of claim 1, wherein the additive further includes a flame retardant, and the flame retardant includes at least one of a phosphoric acid-based flame retardant, an acrylic-based flame retardant, a fluorine-based flame retardant, a silicone-based polymer flame retardant, or an ionic liquid or combination thereof.

17. The lithium battery of claim 16, wherein a composition ratio of the flame retardant is about 0.1 wt % to about 30 wt % of the electrolyte.

18. The lithium battery of claim 10, wherein the first electrode structure includes a first current collector, and a first electrode layer on the first current collector, and the first electrode layer is provided between the first current collector and the electrolyte.

19. The lithium battery of claim 18, wherein the second electrode structure includes a second current collector, and a second electrode layer on the second current collector, and the second electrode layer is provided between the second current collector and the electrolyte.

* * * * *